United States Patent [19]

Winslow et al.

[11] 4,232,337
[45] Nov. 4, 1980

[54] METHOD AND APPARATUS FOR TRACKING AN OPTICALLY READABLE INFORMATION TRACK

[75] Inventors: John S. Winslow, Altadena; Richard L. Wilkinson, Torrance, both of Calif.

[73] Assignee: MCA Discovision, Inc., Universal City, Calif.

[21] Appl. No.: 968,739

[22] Filed: Dec. 13, 1978

[51] Int. Cl.³ .................... H04N 5/76; H04N 3/02
[52] U.S. Cl. .................... 358/128.5; 179/100.3 G; 179/100.3 V
[58] Field of Search ............ 358/128; 179/100.3 V, 179/100.3 G

[56] References Cited

U.S. PATENT DOCUMENTS

| | | | |
|---|---|---|---|
| 3,931,459 | 1/1976 | Korpel | 179/100.3 G |
| 4,044,378 | 8/1977 | Laub | 358/128 |
| 4,065,786 | 12/1977 | Stewart | 358/128 |

Primary Examiner—Daryl W. Cook
Attorney, Agent, or Firm—Ronald J. Clark

[57] ABSTRACT

Apparatus, and a related method, for maintaining an incident beam of radiation in alignment with the centerline of a movable, optically-readable information track, wherein the track comprises a succession of light-reflecting and light-scattering regions representative of a frequency modulated carrier and the sides of the track are adapted to scatter incident radiation in predetermined directions. The apparatus includes photodetector means for sensing the amount of radiation scattered by each side of the track and for generating an error signal indicative of the deviation of the incident beam relative to the centerline of the track, along with means responsive to the error signal for controllably moving the incident beam into alignment with the centerline of the track.

21 Claims, 11 Drawing Figures

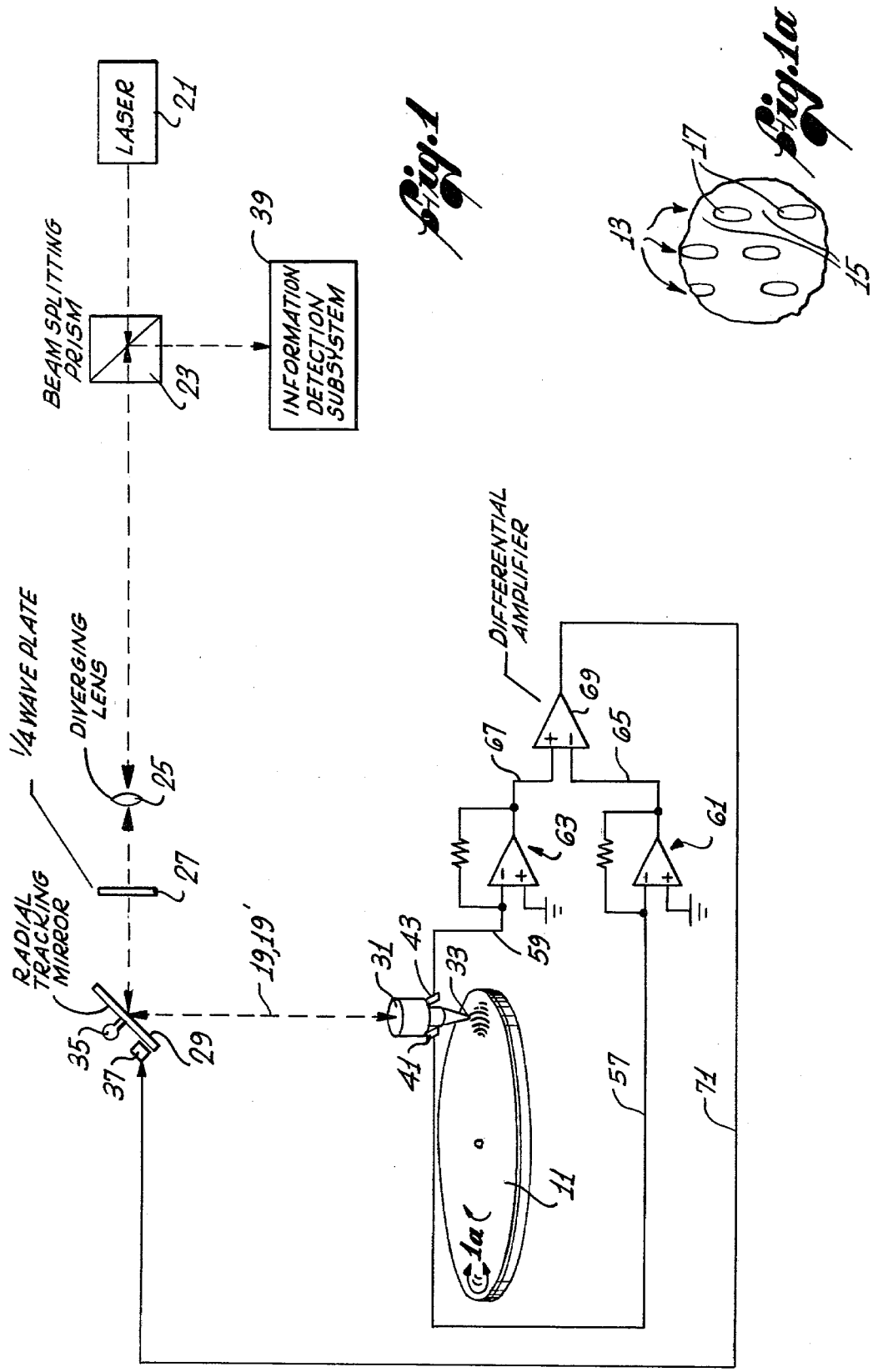

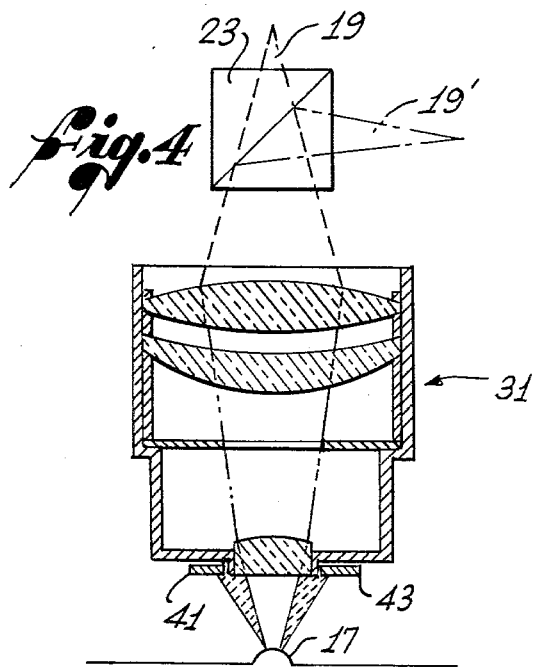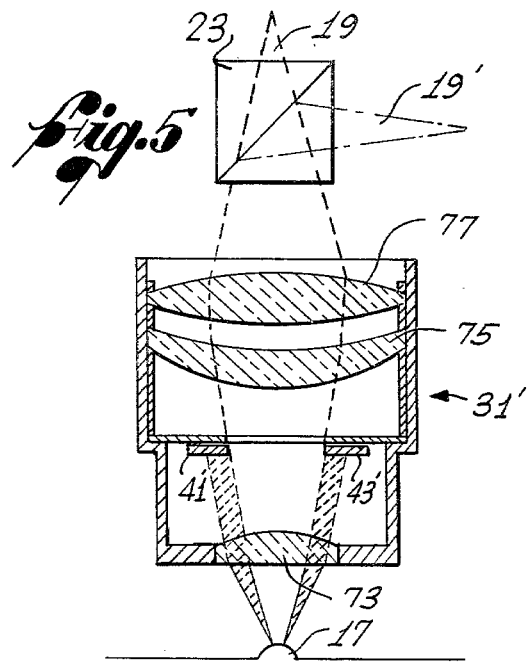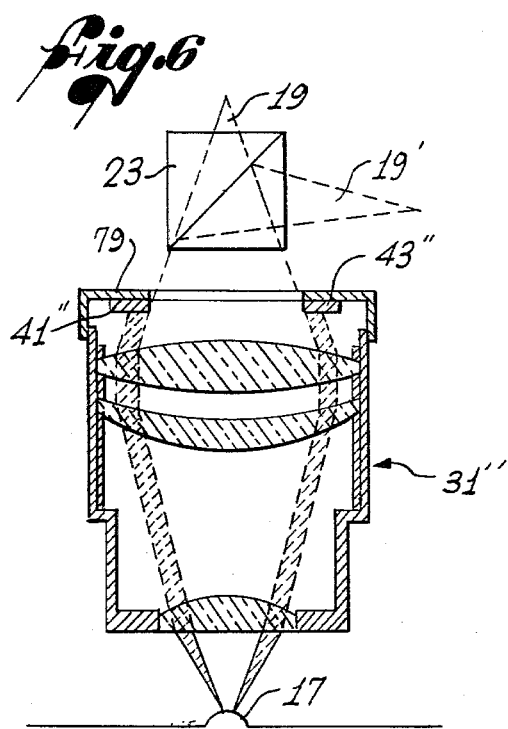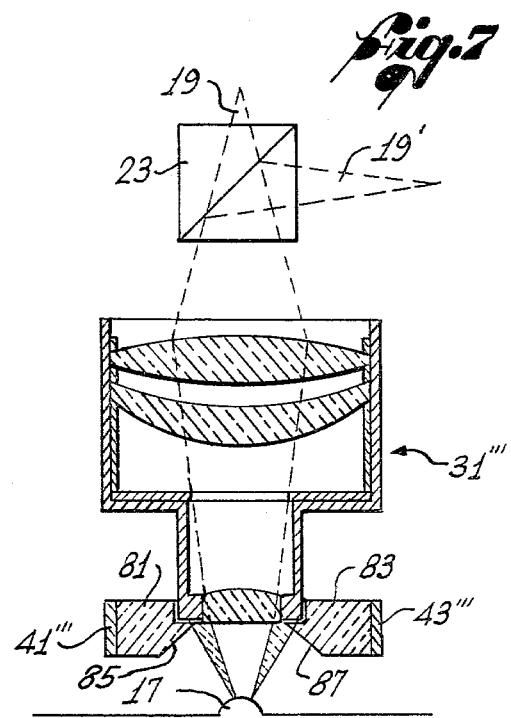

METHOD AND APPARATUS FOR TRACKING AN OPTICALLY READABLE INFORMATION TRACK

BACKGROUND OF THE INVENTION

This invention relates generally to systems for recovering information from information storage media, and, more particularly, to apparatus for centering a beam of radiation on an information track in such a medium.

Tracking apparatus of this particular type are especially adapted for use in a system for recovering information from an optically-readable video disc, wherein video signals and other types of information are stored in a plurality of substantially circular information tracks arranged in either a spiral or concentric circle pattern. Typically, each information track on the disc comprises a succession of light-reflecting and light-scattering regions representative of a high-frequency carrier that is frequency modulated by the video signal being stored. The successive light-scattering regions typically take the form of bumps or pits which are separated by a planar reflective area, such bumps or pits having sloped sides adapted to scatter any incident radiation in predetermined directions.

A video disc player ordinarily operates to recover a video signal from such a video disc by focusing a beam of radiation onto the disc with a microscope objective lens, while the disc is rotated with respect to the beam at a prescribed angular velocity. Radiation reflected from the disc will have an intensity that is modulated by the successive light-reflecting and light-scattering regions, and will be transmitted back through the objective lens to a photodetector for detecting the modulated radiation. In order to store a reasonably large amount of information on the disc, successive information tracks must be so closely spaced that even a slight degree of disc eccentricity will cause the beam of radiation to traverse a number of adjacent tracks on each revolution. Consequently, some means must be provided for applying transverse or radial corrections to the beam position, so that it substantially follows along the center of the selected information track.

One prior technique for centering a beam of radiation on a track of a video disc utilizes a pair of contiguous photodetectors for detecting radiation reflected from the disc, one such detector adapted to receive radiation reflected from the outboard half of the track and the other adapted to receive radiation from the inboard half of the track. A summation of the signals produced by the two photodetectors produces an information signal representative of the frequency modulated carrier, and a differencing of the two signals produces an error signal indicative of the deviation of the incident beam relative to the center of the track. Coupling this error signal to a movable mirror that directs the incident beam of radiation onto the disc permits the relative radial position of the beam to be controllably adjusted, to bring it into proper alignment with the center of the track. As a result, the information signal will be properly representative of the information recorded on the disc. Although this technique has proved satisfactory for many applications, it requires a precise alignment of the two photodetectors and it is highly sensitive to noise and vibration. Moreover, since the photodetectors must be spaced a substantial distance from the focal point of the reflected radiation, it can sometimes be difficult to produce detectors having sufficient size to receive all of the radiation, yet still having a sufficiently fast response time to detect the frequency modulated carrier.

Another technique for tracking the center of an information track utilizes three separate beams of radiation focused onto the disc by an objective lens, one beam for impinging on the center of the track being read, and two side beams for impinging on opposite edges of the track. The three beams of radiation are reflected from the disc in accordance with the recorded information, and are transmitted back through the objective lens to three separate photodetectors. A comparison of the signals produced by the photodetectors for the two side beams produces an error signal for controlling the angular position of a movable radial tracking mirror that directs the three beams onto the disc. Thus, the center beam can be moved radially into alignment with the center of the track. Although this technique, like the technique described earlier, is satisfactory for use in many applications, it requires the use of three separate beams of radiation and it requires a precise alignment of the beams with respect to the corresponding photodetectors and with respect to the track.

Accordingly, it will be appreciated that there has been a need for an improved center tracking apparatus that does not require an unduly precise alignment of certain of its elements and that is not unduly sensitive to noise and vibration. The present invention meets this need.

SUMMARY OF THE INVENTION

Basically, the present invention is embodied in an improved apparatus, and a related method, for tracking the center of an optically readable information track on a movable information storage medium, wherein the track has sides adapted to scatter incident radiation in predetermined lateral directions. The apparatus is used in combination with an information recovery system having means for directing a beam of radiation onto the information storage medium, and information recovery means for detecting radiation reflected therefrom. In accordance with the invention, the apparatus further includes means, separate from the information recovery means, for detecting the magnitude of radiation scattered laterally by the information track, to produce an error signal indicative of the deviation of the beam of radiation relative to the track, along with means for controllably positioning the beam of radiation in accordance with the error signal.

More particularly, an apparatus constructed in accordance with the present invention is especially adapted for use in a system for recovering information from an information storage disc having a plurality of substantially circular and concentrically arranged information tracks. Each track comprises an alternating sequence of light-reflecting and light-scattering regions representative of a frequency modulated carrier, and the width of each track is approximately equal to the diameter of the beam of radiation. The light-reflecting regions are typically portions of a planar, reflective disc, and the light-scattering regions are typically in the form of bumps or pits formed in the planar disc. The outboard side of each such bump is adapted to scatter incident radiation radially outwardly, and the inboard side is adapted to scatter incident radiation radially inwardly. When the beam of radiation is properly centered on an information track, the intensity of radiation scattered radially outwardly will be substantially equivalent to the intensity of radiation scattered radially inwardly.

The means for detecting scattered radiation preferably includes two tracking photodetectors, one positioned to receive radiation scattered radially outwardly, and the other positioned to receive radiation scattered radially inwardly. Each photodetector produces a signal representative of the intensity of the radiation it receives, and these two signals are compared to each other in a differential amplifier circuit to produce the error signal. The error signal is utilized to controllably position a movable mirror that directs the beam of radiation onto the disc, whereby the radial position of the beam is automatically moved into substantial alignment with the centerline of the information track being scanned. Since the error signal need have a bandwidth wide enough only to adequately compensate for tracking errors, the two tracking photodetectors can have relatively low response time characteristics.

The information recovery system can include a microscope objective lens for focusing the beam of radiation onto the disc and for collecting radiation reflected from the disc, and means for directing the reflected radiation to a suitable photodetector for recovering the information recorded. The two photodetectors for detecting scattered radiation can be positioned in a number of locations with respect to the objective lens.

In one embodiment, the two tracking photodetectors are positioned intermediate the objective lens and the disc, one detector on the outboard side of the lens aperture and the other on the inboard side of the aperture. The photodetectors are preferably elongated in shape and arranged with their longitudinal axes parallel to the centerline of the track. In this position, the scattered radiation is received directly, without passage through any intermediate optical elements, and the transmission of reflected radiation back through the objective lens to the information recovery photodetector is not impeded in any respect.

In another embodiment, the tracking photodetectors are mounted on a pair of transparent plastic blocks secured to the bottom portion of the objective lens, and scattered radiation is transmitted through the blocks to the detectors. The blocks have receiving faces positioned substantially at right angles to the scattered radiation, whereby only a small portion of the radiation is reflected away and the remainder is transmitted to the photodetectors. The blocks can be conveniently mounted on the objective lens, without interfering in any respect with the directing of reflected radiation back through the lens to the information recovery system photodetector.

In still another embodiment, the objective lens includes a pair of axially aligned lenses arranged in spaced relationship, and the two photodetectors are positioned intermediate the two lenses, on opposite sides of their common optical axis. In another embodiment of the invention, the two photodetectors are positioned above the objective lens, one being adapted to receive radiation transmitted by the radially outward portion of the lens, and the other adapted to receive radiation transmitted by the radially inward portion of the lens. In both of these latter two embodiments, the numerical aperture of the objective lens must be sufficiently high to collect both reflected radiation for transmission to the information recovery system photodetector and scattered radiation for detection by the two tracking photodetectors.

Other aspects and advantages of the present invention will become apparent from the following description of the preferred embodiments, taken in conjunction with the accompanying drawings, which disclose, by way of example, the principles of the invention.

BRIEF DESCRIPTION OF THE DRAWINGS

FIG. 1 is a simplified schematic diagram of a radial tracking servo apparatus in accordance with the present invention, shown in combination with a system for recovering information from an optically-readable video disc;

FIG. 1(a) is an enlarged plan view of a portion of the video disc of FIG. 1;

FIG. 4 is a sectional view of the microscope objective lens of FIG. 1, showing more specifically the arrangement of the two photodetectors beneath the lens;

FIG. 5 is a sectional view of another embodiment of the present invention, wherein the two photodetectors are positioned in the interior of the objective lens;

FIG. 6 is a sectional view of still another embodiment of the present invention, wherein the two photodetectors are positioned above the objective lens; and FIG. 7 is a sectional view of yet another embodiment of the present invention, wherein the two photodetectors are mounted on transparent blocks secured to the bottom portion of the objective lens.

DESCRIPTION OF THE PREFERRED EMBODIMENTS

Figure 2A:
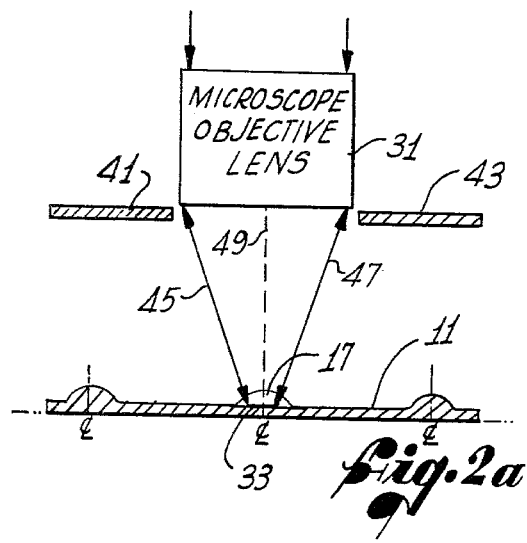
FIGS. 2(a)–2(d) are simplified schematic views of an incident beam of radiation being reflected and scattered from various portions of an information track on a video disc, a portion of the scattered beam shown being received by the tracking photodetectors of the servo apparatus of FIG. 1.

As shown in the accompanying drawings, the present invention is embodied in a servo apparatus for maintaining a read beam of radiation aligned with the centerline of an information track on an optically readable information storage disc. The apparatus is shown in combination with an optical video disc playback system of the type described in a commonly assigned, copending application for U.S. patent, Ser. No. 890,670, filed in the name of Wayne R. Dakin et al and entitled "Video Disc Player".

As shown in FIGS. 1 and 1a, information is typically stored on a video disc 11 in a plurality of substantially circular and concentrically arranged information tracks 13, each comprising an alternating sequence of light-reflecting and light-scattering regions 15 and 17, respectively, representative of a carrier signal that is frequency modulated by the information. The information is recovered by directing a read beam of radiation 19 onto the disc as the disc is rotated at a prescribed angular velocity, thereby producing a reflected beam 19' that is modulated by the pattern of light-reflecting and light-scattering regions.

The light-reflecting regions 15 are typically portions of a reflective plane, and the light-scattering regions 17 are typically in the form of upraised bumps formed in the plane. The radially inward, or inboard, sides of the successive bumps are adapted to scatter incident radiation in a radially inward direction, and, similarly, the radially outward, or outboard, sides are adapted to scatter incident radiation radially outwardly.

The optical playback system of FIG. 1 includes a laser 21 for producing the read beam of radiation 19 that is focused onto the video disc 11. The beam 19 is first transmitted through a beam splitting prism 23, a diverging lens 25, and a quarter-wave plate 27, after which it is reflected by a radial tracking mirror 29 and finally focused onto the disc 11 by a microscope objective lens 31. A spot 33 of radiation is thereby formed at the point of impingement of the beam with the disc, with the diameter of the spot preferably being approximately equal to the width of each information track 13. The aperture of the objective lens is preferably fully illuminated by the beam of radiation 19, so that the resolving power of the lens is fully utilized. The radial tracking mirror 29 is pivotally mounted, as shown at 35, and is adjustable in angle by means of a transducer 37. The beam 19' reflected from the disc follows essentially the same optical path back to the beam splitting prism 23, where it is reflected to an information detection subsystem 39 that includes a suitable photodetector for sensing the modulated intensity of the reflected beam.

Since most video discs, especially those produced for consumer use, will have relatively large eccentricities, some means must be provided for maintaining the beam of radiation 19 centered as closely as possible on the information track 13 being read. Typically, the beam is made to follow the successive tracks by translating a portion of the optical playback assembly radially across the disc 11 at a constant speed, with corrections for eccentricity and other tracking errors being made by means of the radial tracking servo apparatus, which includes the radial tracking mirror 29.

In accordance with the invention, the radial tracking servo apparatus further includes means for detecting radiation scattered by the sides of the information track 13 being scanned and means for producing an error signal indicative of the deviation of the beam of radiation 19 relative to the centerline of the track. The error signal is coupled to the radial tracking mirror transducer 37, to appropriately adjust the relative radial position of the beam of radiation 19, to maintain it substantially aligned with the centerline of the track.

In the embodiment of FIG. 1, the means for detecting scattered radiation takes the form of an inboard photodetector 41 and an outboard photodetector 43 disposed intermediate the objective lens 31 and the disc 11, each photodetector being adapted to detect radiation scattered by a separate side of the track. The photodetectors can be silicon photocells and are preferably elongated in shape, with their longitudinal axes substantially parallel to the axis of the track being scanned. The inboard photodetector 41 is disposed adjacent the radially inward side of the lower aperture of the objective lens 31, whereby it receives radiation scattered radially inwardly by the disc, and the outboard photodetector 43 is disposed adjacent the radially outward side of the lower aperture of the lens, whereby it receives radiation scattered radially outwardly. Each photodetector generates an electrical current signal substantially directly proportional to the magnitude of radiation it receives. Since the tracking photodetectors 41 and 43 are separate from the photodetector in the information detection subsystem 39, they need not have a response time sufficiently fast to detect radiation intensity variations caused by the recorded information. They must be fast enough only to detect variations in average radiation intensity that might result from tracking errors, typically substantially less than 10 kilohertz.

Referring now to FIGS. 2(a) through 2(d), there are shown a number of schematic drawings illustrating the principle of operation of the radial tracking servo apparatus of the present invention. Referring specifically to FIG. 2(a), the video disc is shown schematically at 11, with its information tracks 13 aligned in a direction normal to the drawing. The read beam 19 is shown being focused by the microscope objective lens 31 onto the light-reflecting region between two successive bumps 17, forming a spot indicated by the line 33. Both the read beam 19 and the reflected beam 19' lie between a pair of double-headed arrows, indicated at 45 and 47. It will be appreciated that no part of the radiation beam is scattered beyond the edges of the lower aperture of the objective lens, to either of the two tracking photodetectors 41 and 43.

Figure 2B:
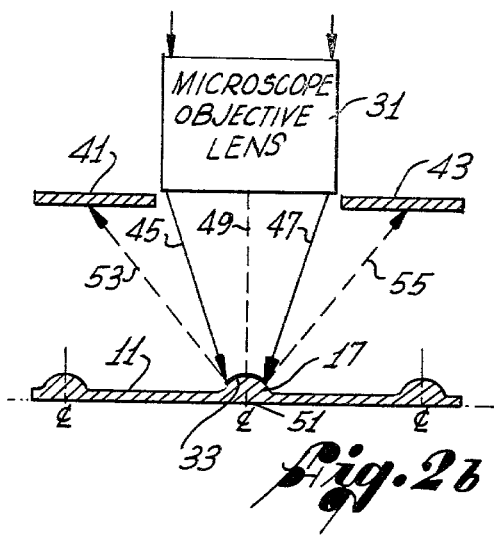

FIG. 2(b) depicts the read beam 19, again indicated as lying between the arrows 45 and 47, being focused to a spot 33 on a radiation-scattering bump 17. The centerline of the read beam, represented by a reference line 49, is shown in alignment with the track centerline, represented by a reference line 51. The reflected beam 19', which lies between a pair of arrows 53 and 55, is wider than the read beam 19 and is scattered to each side of the lower aperture of the objective lens 31 by an equal amount. The magnitude of the radiation scattered to the left of the objective lens, i.e. radiation lying between the arrows 45 and 53, is measured by the inboard photodetector 41, and, similarly, the magnitude of the radiation scattered to the right, i.e., radiation lying between the arrows 47 and 55, is detected by the outboard photodetector 43. It will be appreciated that, since the centerline of the radiation beam is aligned with the centerline of the track, each of the two photodetectors will receive an equal amount of scattered radiation and will produce equal electrical current signals.

Figure 2C:
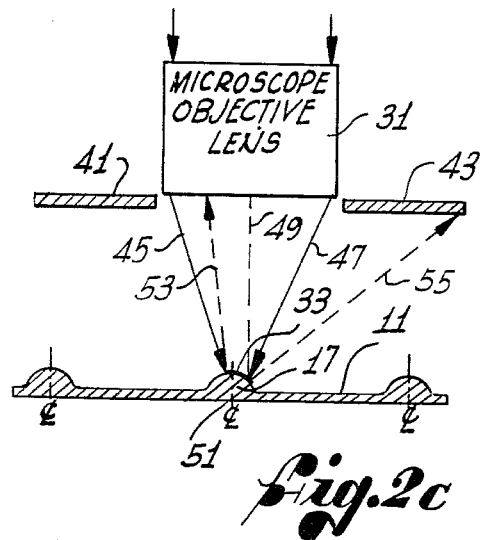

FIG. 2(c) depicts an extreme example of tracking misalignment, wherein the centerline 49 of the read beam 19 is positioned to the outboard side of the track centerline 51. The read beam is again shown lying between the arrows 45 and 47, and the reflected beam between the arrows 53 and 55. It will be noted that no radiation is scattered to the inboard side of the lower aperture of the objective lens 31, whereas substantial radiation, i.e., radiation lying between the arrows 47 and 55, is scattered to the outboard side, where it is detected by the outboard photodetector 43. Thus, the electrical current signal produced by the outboard photodetector 43 will be substantially greater than that produced by the inboard photodetector 41.

Figure 2D:
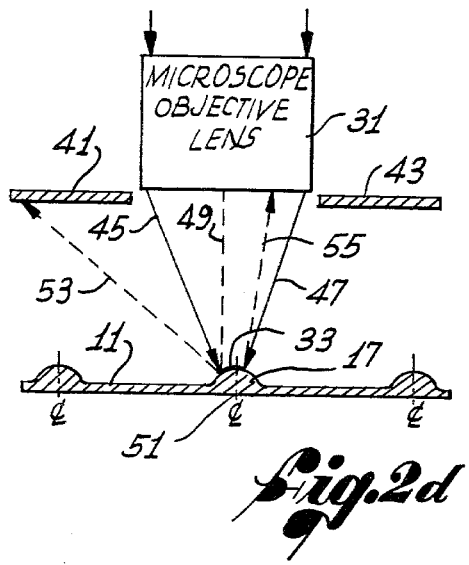

FIG. 2(d) depicts another extreme example of tracking misalignment, wherein the centerline 49 of the read beam 19 is positioned to the inboard side of the track centerline 51. In this example, no radiation is scattered to the outboard side of the lower aperture of the objective lens 31, whereas substantial radiation, i.e. radiation lying between the arrows 45 and 53, is scattered to the inboard side of the aperture. Thus, the electrical current signal produced by the inboard photodetector 41 will be substantially greater than that produced by the outboard photodetector 43.

Referring again to FIG. 1, it is shown that the electrical current signals generated by the two photodetectors 41 and 43 are transmitted over lines 57 and 59 to separate amplifiers 61 and 63, respectively, which produce corresponding voltage signals. The respective voltage signals are coupled over lines 65 and 67 to a conventional differential amplifier circuit 69, which subtracts the inboard voltage signal from the outboard voltage signal to produce the aforementioned error signal. The error signal is, in turn, coupled over line 71 to the radial tracking mirror transducer 37.

Figure 3:
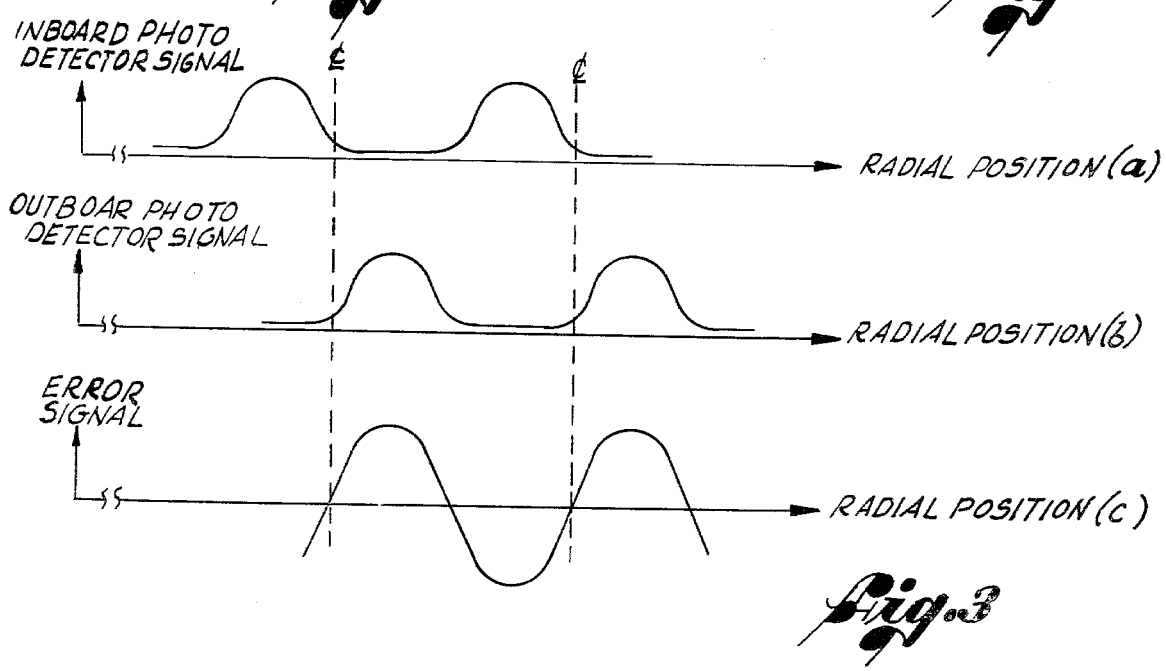
FIGS. 3(a)–3(c) are waveform diagrams showing the electrical current signals produced by the two photodetectors of FIG. 1 and the error signal produced by the differential amplifier of FIG. 1, all of which vary according to the position of the incident beam of radiation relative to the centerline of the information track.

FIGS. 3(a) through 3(c) illustrate the electrical current signals generated by the two tracking photodetectors 41 and 43, along with the error signal produced by the differential amplifier circuit 69. It will be observed that the current signal produced by the inboard photodetector 41 is a maximum when the read beam 19 is aligned with the inboard side of an information track 13, since a maximum amount of radiation is then scattered radially inwardly (see FIG. 2(d)). Similarly, the current signal produced by the outboard photodetector 43 is a maximum when the read beam 19 is aligned with the outboard side of a track, since a maximum amount of radiation is then scattered radially outwardly (see FIG. 2(c)). When the read beam is properly centered on a track (see FIG. 2(b)), the two current signals are equal.

The error signal (FIG. 3(c)) is produced by the differential amplifier circuit and corresponds to the difference between the two electrical current signals (FIGS. 3(a) and 3(b)). It is a maximum when the read beam 19 is aligned with the outboard side of an information track 13, a minimum when the beam is aligned with the inboard side of a track, and zero when the beam is aligned with the center of a track. Thus, the error signal can be used effectively to controllably adjust the angular position of the radial tracking mirror 29, to direct the beam to the center of a selected track. When the beam has deviated to the inboard side of the track, the error signal will automatically have a negative polarity and the beam will automatically be moved radially outwardly, in the direction of the center of the track. Conversely, when the beam has deviated to the outboard side of the track, the error signal will automatically have a positive polarity and the beam will automatically be moved radially inwardly, in the direction of the center of the track.

FIG. 4 is a side sectional view of the microscope objective lens 31 of FIG. 1, wherein the inboard and outboard photodetectors 41 and 43, respectively, are positioned below the lens and adapted to receive scattered radiation directly, without passage through any separate optical elements. Thus, there is no interference with the portion of the reflected radiation beam 19' being directed back through the objective lens to the information detection subsystem 39.

FIG. 5 shows an objective lens 31' of another embodiment of the present invention. The lens 31' includes three separate convex lens 73, 75, and 77 arranged in spaced relationship, with their respective optical axes in alignment. The inboard and outboard photodetectors 41' and 43', respectively, are positioned intermediate the lower two lens 73 and 75, on opposite sides of the optical axis. In this location, the detectors are protected from any adverse environment influences that might exist. As is the case with the first embodiment (FIG. 4), the inboard detector receives radiation scattered radially inwardly and the outboard detector receives radiation scattered radially outwardly. Accordingly, the resulting electrical current signals and the resulting error signal will correspond to the signals depicted in FIGS. 3(a) through 3(c). It should be recognized that the numerical aperture of the lower portion of this embodiment of the objective lens 31' must be greater than that of the embodiment of FIG. 4, since it must transmit not only reflected radiation for transmission to the information detection subsystem 39, but also scattered radiation for detection by the two photodetectors 41' and 43'.

Another embodiment of an objective lens 31" in accordance with the present invention is shown in FIG. 6, wherein the inboard and outboard photodetectors 41" and 43" are conveniently mounted on the underside of a plate 79 attached to the top portion of the lens. As was the case with the first two embodiments (FIGS. 4 and 5), the inboard and outboard photodetectors are positioned to receive radiation scattered radially inwardly and radially outwardly, respectively. Additionally, the numerical aperture of the lens must be sufficiently high to transmit both reflected and scattered radiation. The resulting electrical current signals and the resulting error signal correspond to the signals depicted in FIGS. 3(a) through 3(c).

FIG. 7 shows still another embodiment of an objective lens 31''' in accordance with the present invention, wherein the photodetectors 41''' and 43''' are bonded to transparent plastic blocks 81 and 83, respectively, secured to the bottom portion of the lens. Radiation scattered radially inwardly and radially outwardly by the disc is directed to the blocks 81 and 83, where it impinges on receiving faces 85 and 87, respectively, positioned substantially at right angles to the received radiation. Thus, only a small proportion of scattered radiation is reflected by each block, and the remainder is transmitted to the corresponding detector, some of the transmitted radiation being internally reflected in the block a plurality of times before impinging on the detector. The blocks 81 and 83 can be machined to fit snugly on the objective lens 32''', without blocking transmission of the reflected beam of radiation 19' back through the lens aperture.

From the foregoing description, it should be apparent that the present invention provides an effective apparatus for use in an optical information recovery system, for controllably maintaining a read beam of radiation in alignment with the centerline of a movable information track. The apparatus operates by detecting radiation that is scattered laterally by the track, radiation which otherwise would not be utilized by the information recovery system, thus not interfering or otherwise adversely affecting a proper recovery of the recorded information.

Although the invention has been described in detail with reference to its presently preferred embodiments, it will be understood by one of ordinary skill in the art that various modifications can be made, without departing from the spirit and scope of the invention. Accordingly, it is not intended that the invention be limited, except as by the appended claims.

We claim:

1. Tracking apparatus for use in a system for recovering information from an optically readable record medium, wherein the information is stored in a track having sides adapted to scatter in a predetermined direction any radiation impinging thereon, said tracking apparatus operating to controllably position an incident beam of radiation in a prescribed relationship relative to the track, said tracking apparatus comprising:

optical means for directing the incident beam of radiation onto the record medium as the medium is moved relative thereto, said incident beam of radiation being reflected by the medium in accordance with the stored information to produce an intensity-modulated reflected beam of radiation;

said optical means further operating to direct the reflected beam of radiation to information recovery means for detecting the modulated intensity thereof;

means, separate from the information recovery means, for detecting radiation scattered by the sides of the track, to produce an error signal indicative of the position of the incident beam of radiation relative to the centerline of the track; and means responsive to the error signal for controllably positioning the incident beam of radiation in the prescribed relationship relative to the track.

2. Tracking apparatus as defined in claim 1, wherein said means for detecting radiation includes:

first means for detecting radiation scattered from one side of the track; and second means for detecting radiation scattered from the other side of the track.

3. Tracking apparatus as defined in claim 2, wherein:

said first means operates to produce a first signal, indicative of the magnitude of radiation detected thereby;

said second means operates to produce a second signal, indicative of the magnitude of radiation detected thereby; and said means for detecting scattered radiation further includes amplifier means for sensing any difference between the first and second signals and for producing the error signal in accordance with such difference.

4. Tracking apparatus as defined in claim 2, wherein said means for adjusting operates to position the beam of radiation relative to the track such that the average magnitude of radiation detected by said first means is substantially equal to the average mangitude of radiation detected by said second means.

5. Tracking apparatus for use in a system for recovering information from a rotatable information storage disc, wherein the information is stored in a plurality of substantially circular and concentrically arranged tracks, each track formed by a succession of light-reflecting and light-scattering regions, and wherein the portions of the successive light-scattering regions forming one side of each track are adapted to scatter radiation incident thereon in a first direction, and the portions of the successive light-scattering regions forming the other side of each track are adapted to scatter radiation incident thereon in a second direction, said tracking apparatus operating to controllably position an incident beam of radiation in a prescribed relationship relative to a selected one of the tracks, said tracking apparatus comprising:

an objective lens for focusing the incident beam of radiation onto the information storage disc, as the disc is rotated relative thereto, said incident beam of radiation being reflected by the disc in accordance with the stored information;

said objective lens further operating to collect the reflected beam of radiation and to direct it to information recovery means for detecting the modulated intensity thereof;

means, separate from the information recovery means, for detecting radiation scattered by the sides of the selected track and for producing an error signal indicative of the position of the incident beam of radiation relative to the centerline of the track, said means including a first photodetector for detecting radiation scattered in said first direction, and a second photodetector for detecting radiation scattered in said second direction; and means responsive to the error signal for controllably positioning the incident beam of radiation in the prescribed relationship relative to the selected track.

6. Tracking apparatus as defined in claim 5, wherein:

said first photodetector operates to produce a first signal, indicative of the magnitude of radiation received thereby;

said second photodetector operates to produce a second signal, indicative of the magnitude of radiation received thereby; and said means for detecting scattered radiation further includes amplifier means for sensing any difference between said first and second signals and for producing said error signal in accordance with such difference.

7. Tracking apparatus as defined in claim 6, wherein said means for adjusting operates to position the incident beam of radiation relative to the selected track such that the average value of the error signal is substantially zero.

8. Tracking apparatus as defined in claim 5, wherein said first and second photodetectors are elongated in shape and positioned intermediate the objective lens and the disc, on opposite sides of the objective lens, the longitudinal axes of the photodetectors being substantially parallel to that of the selected track.

9. Apparatus for recovering information from a rotatable information storage disc, wherein the information is stored in a plurality of substantially circular and concentrically arranged tracks, each track formed by a succession of light-reflecting and light-scattering regions representative of the information stored thereon, and wherein the portions of the successive light-scattering regions forming one side of each track are adapted to scatter radiation incident thereon in a first direction and the portions of the successive light-scattering regions forming the other side of each track are adapted to scatter radiation incident thereon in a second direction, said apparatus comprising:

means for rotating the disc at a prescribed angular velocity;

optical means for directing an incident beam of radiation onto the disc, said incident beam being reflected by the disc in accordance with the stored information;

said optical means further operating to collect the reflected radiation and thereby produce a reflected beam of radiation;

information recovery means for detecting the modulated intensity of the reflected beam of radiation; and tracking means for controllably positioning the incident beam of radiation in a prescribed relationship relative to a selected one of the tracks, whereby the radiation reflected from the disc and detected by said information recovery means is representative of the information stored on the track, said tracking means including means, separate from said information recovery means, for detecting radiation scattered by the sides of the selected track and for producing an error signal indicative of the position of the incident beam of radiation relative to the centerline of the track, and means for adjusting the relative position of the incident beam of radiation in accordance with the error signal.

10. Apparatus as defined in claim 9, wherein said means for detecting scattered radiation includes:

a first photodetector for detecting radiation scattered in said first direction; and a second photodetector for detecting radiation scattered in said second direction.

11. Apparatus as defined in claim 10, wherein:

said first photodetector operates to produce a first signal, indicative of the magnitude of radiation received thereby;

said second photodetector operates to produce a second signal, indicative of the magnitude of radiation received thereby; and said means for detecting scattered radiation further includes amplifier means for sensing any difference between said first and second signals and for producing said error signal in accordance with such difference.

12. Apparatus as defined in claim 10, wherein said means for adjusting operates to position the beam of radiation relative to the selected track such that the average magnitude of radiation received by said first photodetector is substantially equal to the average magnitude of radiation received by said second photodetector.

13. Tracking apparatus for use in a system for recovering information from a rotatable information storage disc, wherein the information is stored in a plurality of substantially circular tracks arranged in a spiral pattern, each track formed by a succession of planar light-reflecting regions and light-scattering bumps, and wherein the portions of the successive light-scattering bumps forming the inboard side of each track are adapted to scatter radiation incident thereon in a radially inward direction, and the portions of the successive light-scattering bumps forming the outboard side of each track are adapted to scatter radiation incident thereon in a radially outward direction, said tracking apparatus operating to controllably position an incident beam of radiation in substantial alignment with the centerline of a selected one of the tracks, said tracking apparatus comprising:

a microscope objective lens for focusing the incident beam of radiation onto the disc, said incident beam being reflected by the disc in accordance with the stored information;

said microscope objective lens further operating to collect the reflected beam of radiation and to direct it to information recovery means for detecting the modulated intensity thereof;

an inboard photodetector for receiving radiation scattered radially inwardly by the disc and for producing an inboard signal proportional to the magnitude of such radiation;

an outboard photodetector for receiving radiation scattered radially outwardly by the disc and for producing an outboard signal proportional to the magnitude of such radiation, wherein said inboard and outboard photodetectors are elongated in shape and positioned intermediate the objective lens and the disc, on opposite sides of the objective lens, the longitudinal axes of the photodetectors, being substantially parallel to that of the selected track;

a differential amplifier circuit for producing an error signal proportional to the difference between said inboard signal and said outboard signal, said error signal thereby indicative of the deviation of the incident beam of radiation relative to the centerline of the selected track;

an angularly movable radial tracking mirror for adjusting the radial position of the incident beam of radiation relative to the disc; and a radial tracking mirror transducer, responsive to the error signal, for controllably moving the radial tracking mirror to position the incident beam of radiation in substantial alignment with the centerline of the selected track.

14. A track centering method for use with a system for recovering information from an optically readable record medium, wherein the information is stored in a track having sides adapted to scatter in a predetermined direction any radiation impinging thereon, said tracking method functioning to controllably position an incident beam of radiation in a prescribed relationship relative to the track, said method comprising the steps of:

directing the incident beam of radiation onto the record medium as the medium is moved with respect thereto, said beam of radiation being reflected by the medium in accordance with the stored information;

directing the reflected beam of radiation to information recovery means for detecting the modulated intensity thereof;

detecting radiation scattered by the sides of the track, and producing an error signal indicative of the position of the incident beam of radiation relative to the centerline of the track; and controllably positioning the incident beam of radiation in the prescribed relationship relative to the track, in accordance with the error signal.

15. A track centering method as defined in claim 14, wherein said step of detecting scattered radiation includes the steps of:

detecting radiation scattered from one side of the track, and producing a first signal, indicative of the magnitude of such detected radiation;

detecting radiation scattered from the other side of the track, and producing a second signal, indicative of the magnitude of such detected radiation; and determining the difference between the first and second signals, and producing the error signal in accordance with such difference.

16. A tracking method as defined in claim 15, wherein said step of adjusting positions the beam of radiation relative to the track such that the average value of the error signal is substantially zero.

17. Tracking apparatus for use in a system for recovering information from a rotatable information storage disc, wherein the information is stored in a plurality of substantially circular and concentrically arranged tracks, each track formed by a succession of light-reflecting and light-scattering regions, and wherein the portions of the successive light-scattering regions forming one side of each track are adapted to scatter radiation incident thereon in a first direction, and the portions of the successive light-scattering regions forming the other side of each track are adapted to scatter radiation incident thereon in a second direction, said information recovery system including an objective lens for focusing an incident beam of radiation onto the disc and information recovery means for detecting radiation reflected from the disc, said tracking apparatus operating to controllably position the beam of radiation in a prescribed relationship relative to a selected one of the tracks, said tracking apparatus comprising:

means for detecting radiation scattered by the sides of the selected track and for producing an error signal indicative of the position of the beam of radiation relative to the centerline of the track, said means including a first photodetector for detecting radiation scattered in said first direction, and a second photodetector for detecting radiation scattered in said second direction; and means for adjusting the relative radial position of the beam of radiation in accordance with the error signal;

wherein radiation reflected by the disc is directed back through the objective lens to the information recovery means;

wherein the objective lens includes two axially aligned lenses arranged in spaced relationship with respect to each other;

and wherein said first and second photodetectors are elongated in shape and positioned intermediate the two axially aligned lenses in the objective lens, on opposite sides of the optical axis os the objective lens, the longitudinal axes of the photodetectors being substantially parallel to that of the selected track.

18. Tracking apparatus for use in a system for recovering information from a rotatable information storage disc, wherein the information is stored in a plurality of substantially circular and concentrically arranged tracks, each track formed by a succession of light-reflecting and light-scattering regions, and wherein the portions of the successive light-scattering regions forming one side of each track are adapted to scatter radiation incident thereon in a first direction, and the portions of the successive light-scattering regions forming the other side of each track are adapted to scatter radiation incident thereon in a second direction, said information recovery system including an objective lens for focusing an incident beam of radiation onto the disc and information recovery means for detecting radiation reflected from the disc, said tracking apparatus operating to controllably position the beam of radiation in a prescribed relationship relative to a selected one of the tracks, said tracking apparatus comprising:

means for detecting radiation scattered by the sides of the selected track and for producing an error signal indicative of the position of the beam of radiation relative to the centerline of the track, said means including a first photodetector for detecting radiation scattered in said first direction, and a second photodetector for detecting radiation scattered in said second direction; and means for adjusting the relative radial position of the beam of radiation in accordance with the error signal;

wherein radiation scattered by the disc is directed back through the objective lens to said first and second photodetectors;

and wherein said first and second photodetectors are elongated in shape and positioned on opposite sides of the optical axis of the objective lens to receive scattered radiation transmitted by the objective lens, the longitudinal axes of the photodetectors being substantially parallel to that of the selected track.

19. Tracking apparatus for use in a system for recovering information from a rotatable information storage disc, wherein the information is stored in a plurality of substantially circular and concentrically arranged tracks, each track formed by a succession of light-reflecting and light-scattering regions, and wherein the portions of the successive light-scattering regions forming one side of each track are adapted to scatter radiation incident thereon in a first direction, and the portions of the successive light-scattering regions forming the other side of the each track are adapted to scatter radiation incident thereon in a second direction, said information recovery system including an objective lens for focusing an incident beam of radiation onto the disc and information recovery means for detecting radiation reflected from the disc, said tracking apparatus operating to controllably position the beam of radiation in a prescribed relationship relative to a selected one of the tracks, said tracking apparatus comprising:

means for detecting radiation scattered by the sides of the selected track and for producing an error signal indicative of the position of the beam of radiation relative to the centerline of the track, said means including a first photodetector, a first transparent block positioned to receive radiation scattered in said first direction and to transmit such radiation to said first photodetector, a second photodetector, and a second transparent block positioned to receive radiation scattered in said second direction and to transmit such radiation to said second photodetector; and means for adjusting the relative radial position of the beam of radiation in accordance with the error signal.

20. Tracking apparatus as defined in claim 19, wherein radiation transmitted by each of said first and second transparent blocks is internally reflected by such block prior to being received by the corresponding one of said first and second photodetectors.

21. Tracking apparatus as defined in claim 19, wherein each of said first and second transparent blocks includes a receiving face positioned substantially perpendicular to the scattered radiation it receives, whereby a substantial portion of the scattered radiation received thereby is transmitted to the corresponding one of said first and second photodetectors.

* * * * *